United States Patent [19]

Thau, Jr. et al.

[11] Patent Number: 4,643,461
[45] Date of Patent: Feb. 17, 1987

[54] FIRE RESISTANT SEAL

[75] Inventors: Lawrence W. Thau, Jr., Somerset; Maurice J. Webb, Mountain Lakes, both of N.J.

[73] Assignee: Victaulic Company of America, Easton, Pa.

[21] Appl. No.: 812,136

[22] Filed: Dec. 20, 1985

[51] Int. Cl.[4] .............................................. F16L 17/06
[52] U.S. Cl. .................................... 285/112; 285/373; 285/910; 285/187; 277/26
[58] Field of Search ............... 285/112, 110, 910, 111, 285/187, 373, 104, 105; 277/235, 26, 179, 228, 180, 205

[56] References Cited

U.S. PATENT DOCUMENTS 3,869,132  3/1975  Taylor et al. .................... 277/26

FOREIGN PATENT DOCUMENTS

| 92964 | 6/1923 | Austria | 285/112 |
| 1473793 | 3/1967 | France | 285/112 |
| 33154 | 10/1970 | Japan | 285/112 |
| 16748 | 3/1909 | United Kingdom | 285/910 |
| 315550 | 7/1929 | United Kingdom | 285/112 |

Primary Examiner—Dave W. Arola
Attorney, Agent, or Firm—Abelman Frayne Rezac & Schwab

[57] ABSTRACT

A seal assembly for incorporation into a pipe coupling has a fire-ring which is adapted to seal against the juxtaposed ends of pipes and provide a substantial seal between the pipe ends in the event that the body of the elastomeric seal is subjected of thermal destruction.

20 Claims, 7 Drawing Figures

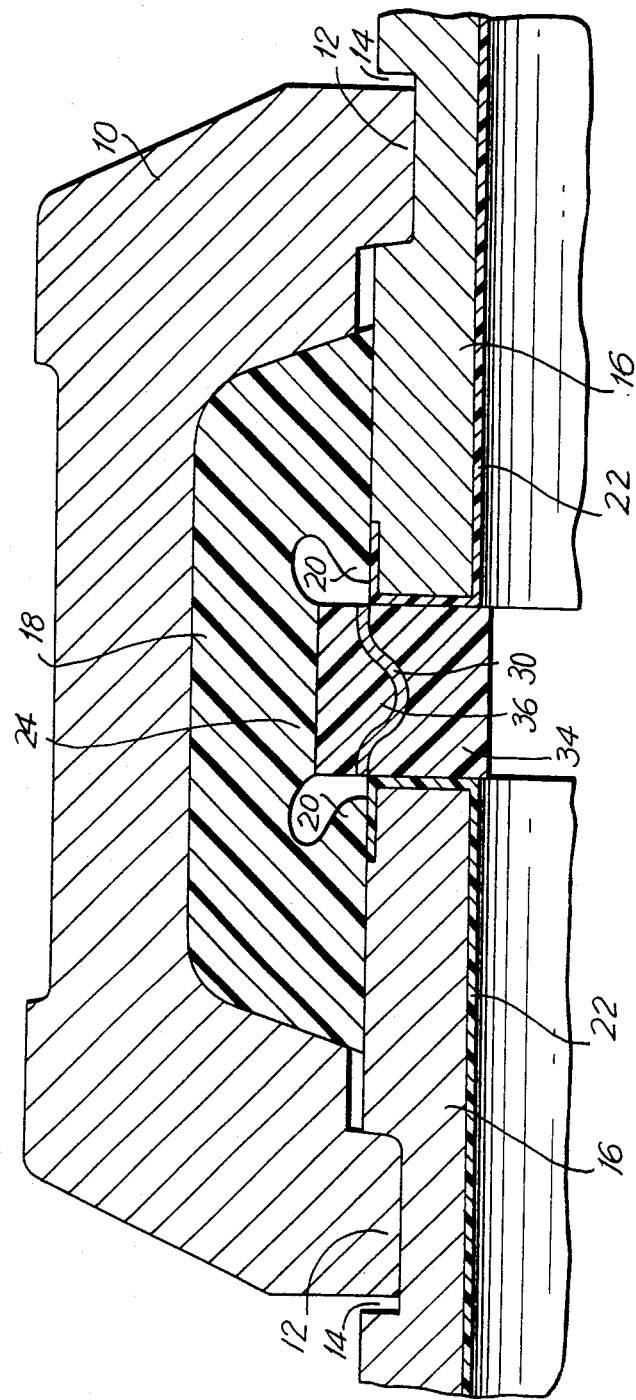

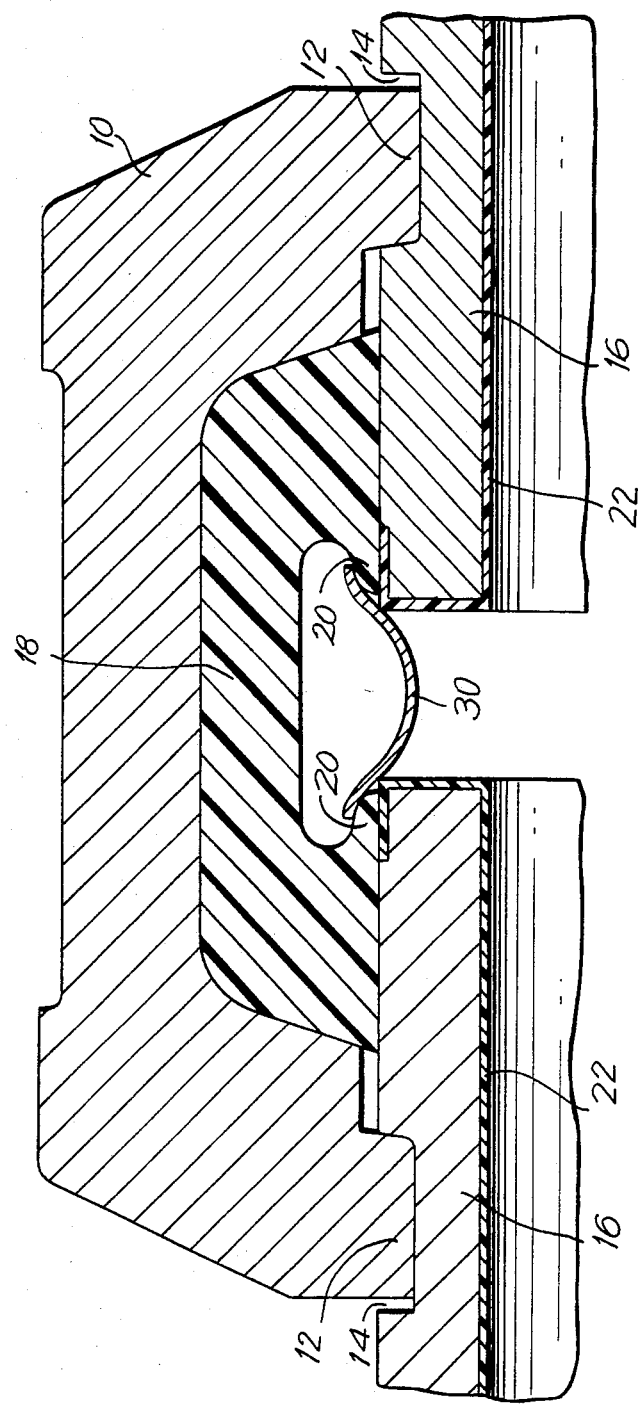

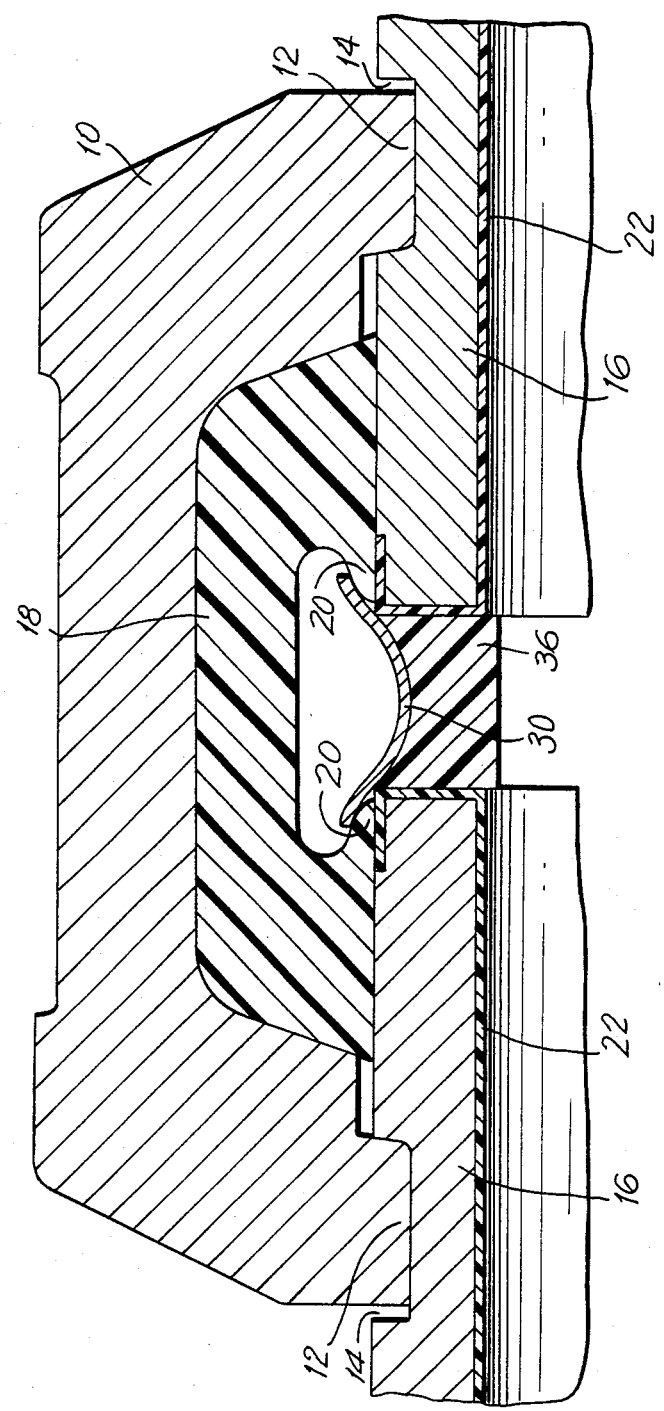

FIRE RESISTANT SEAL

FIELD OF THE INVENTION

This invention relates to elastomeric seals of the type to be employed in conjunction with pipe couplings, and has particular application to such seals for segmented couplings to be employed in pipeline assemblies used in the conveying of flammable fluids such as oil, petroleum or gas, or, in conveying non-flammable fluids such as water, acids or caustic solutions.

BACKGROUND OF THE INVENTION

While pipe couplings have seals formed of an elastomeric material have been used with great success, the use thereof is encumbered with one problem which can occur under particularly adverse conditions. This problems arises in the event that a fire occurs in the immediate vicinity of the coupling of sufficient intensity to cause heating of the elastomeric seal, and eventually, thermal destruction of the elastomeric seal contained within the coupling.

Under particularly adverse conditions, the seal can reach temperatures sufficient to cause volatilisation, vaporisation and carburization of the elastomeric material to the point of total destruction of the seal, and, the conversion of the elastomeric material into a porous and friable coke-like material.

If such a circumstance occurs, then, sealing of the coupling is negated or impaired, with the consequence that fuel comprised by the fluid content of the pipeline assembly is added to the existing external fire, with probable aggravation of the fire condition. In the event that the pipeline assembly is employed for conveying water used for fire extinguishing apparatus, then, the water pressure is lost or severely reduced, thus impairing the efficiency of the fire fighting equipment associated with the pipeline. If the pipeline assembly is employed for conveying noxious substances such as acids or caustic solutions, then, extensive clean-up is required subsequent to the correction of the condition.

BACKGROUND OF THE INVENTION

While the problem discussed above has long been known as a pressing one in the art, little if any attention has been given to the problem, the usual approach being either to ignore the problem due to the remoteness of possibility of its occurrence, or, to avoid the use of couplings containing elastomeric seals, and instead, to employ complex and expensive couplings that are not as readily subject to thermal destruction.

SUMMARY OF THE INVENTION

It is an object of this invention to provide a heat resistant seal for use in a pipe coupling, which has the capability of maintaining satisfactory sealing for an extended period of time, even in the event that the coupling is directly exposed to open flame of an intensity sufficient to cause heating of the coupling to a temperature sufficient to cause thermal destruction of the contained elastomeric gasket.

According to the invention, the elastomeric seal has a fire-ring associated therewith, the fire-ring being formed from a material that is highly resistant to thermal destruction.

The fire-ring is positioned in bridging relationship with the adjacent ends of pipes of the pipeline assembly, such that, in the event of decomposition of the seal, the fire-ring maintains substantially complete sealing engagement with the pipe ends.

The fire-ring may be separate from the elastomeric seal, or alternatively, can be directly attached to or embedded within the elastomeric material comprising the seal.

In one preferred embodiment, the fire-ring is embedded within a radial annular flange of the seal, which extends radially inwardly of the inner periphery of the seal, such that a portion of the annular flange is maintained in registry with the pipe ends, and is located directly within and directly cooled by the fluid contents of the pipeline assembly and is in that manner protected against thermal destruction.

Alternatively, the fire-ring provides the radially innermost face of the annular flange, and is directly cooled by the fluid contents of the pipeline assembly, and, is operative to cool and transmit heat from the radially innermost portion of the annular flange in order to delay the thermal decomposition of the radially innermost portion of the flange and maintain sealing contact with the juxtaposed ends of the associated pipes.

There is no specific requirement that the fire-ring be directly attached to the body of the elastomeric seal, provided that the fire-ring is positively supported and positioned by the juxtaposed ends of the pipes. In this event, the fire-ring is formed at its axial ends to be of greater external diameter than the external diameter of the associated pipes, and, of greater diameter than internal diameter of the sealing lips of the associated elastomeric seal for the sealing lips to maintain the fire-ring loosely captive within the elastomeric seal.

DESCRIPTION OF THE DRAWINGS

The invention will now be described with reference to the accompanying drawings, which illustrate preferred embodiments of the invention, and in which.

DESCRIPTION OF THE PREFERRED EMBODIMENT

Figure 1:
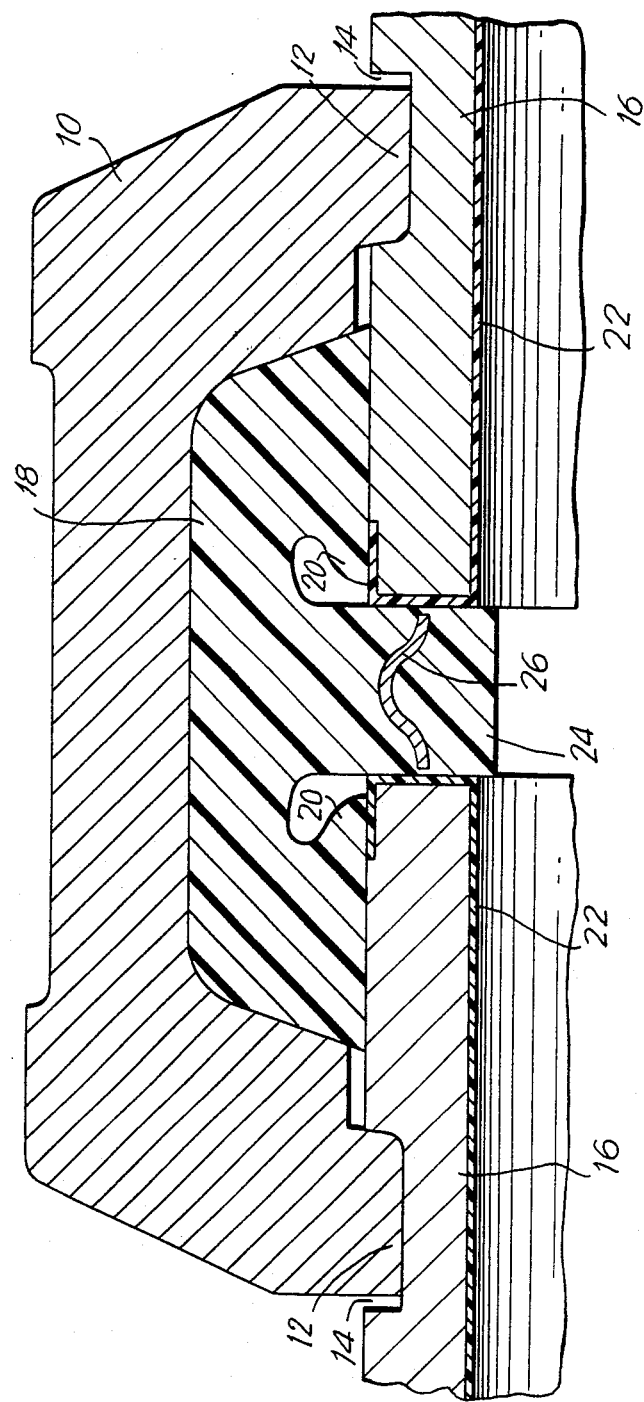
FIG. 1 is a cross-section through one preferred embodiment of heat resistance seal of the present invention.

Referring now to FIG. 1 of the drawings, a transverse cross-section through a pipe coupling segment of a conventional segmented coupling is indicated at 10, the coupling having keys 12 on its respective innermost peripheries for engagement within grooves 14 in the respective juxtaposed ends of pipes 16 of a pipeline assembly.

Contained internally of the coupling segment 10 is a sealing gasket 18 of generally conventional form, and which includes sealing lips 20 for engagement with the exterior surface of the respective pipe ends.

Optionally, the respective pipes may be of the type provided with a lining of plastics material 22, such as are commonly employed in the oil industry.

The elastomeric seal may be comprised of any material specific to the application in which it is to be employed, and typically, will be formed from a relatively hard rubber-like material such as nitrile rubber, E.P.D.M., Viton (registered trademark of the DuPont Company) or the like.

In each of the following embodiments, and in order to further delay leakage from the joint in the event that it is exposed to a conflagration, the seal, or the radial flange of the seal, or specific portions thereof, can be molded from a material that becomes intumescent at high temperatures for it to expand and further pressurize the seal.

Extending radially inwardly of the inner periphery of the elastomeric seal 18 is an annular flange 24 molded integrally with the body of the seal, and which is molded in situ about a metallic fire-ring 26, the fire-ring 26 being formed radially outwardly convex so as to enhance its resilience in an axial direction, and, for it to be resistive to axial loading without collapse of the fire-ring from its intended form when subjected to loading in an axial direction.

In this embodiment, the fire-ring 26 is positioned within the radial flange 24, so that its axial edges are barely concealed within a very thin layer of the elastomeric material. In this manner, the relatively soft plastics lining of the pipes, if provided, is protected against abrasion, cutting or scuffing by the edges of the fire-ring.

The coupling segments preferably, but not essentially, are of the type, such as is commonly known, that will act to move the juxtaposed ends of the respective pipes towards each other as the coupling segments are tightened down, in order to exert a compressive force on the radial annular flange, and in turn, on the axial ends of the fire-ring 26. Such axial compression is not, however, essential.

The fire-ring may be formed of any suitable material, typical materials being carbon steel, or stainless steel, both of which present an inherent an resilience and springiness while retaining a memory of their original shape and configuration.

Should the assembly of FIG. 1 be exposed to an external conflagration, then, heat will be transmitted through the coupling segments 10, which typically are formed of cast ductile iron, and, the elastomeric seal contained within the couplings segments 10 will be exposed to a progressively escalating temperature. The elastomeric material comprising the seal will thus be exposed to a progressively increasing temperature, which will, if it increases sufficiently, eventually cause softening and plasticising of the elastomeric material comprising the seal, and, a further increase of the temperature of the elastomeric material to above its destruction temperature eventually will cause volatilization or vaporization of the volatile components of the seal, and, eventually conversion of the elastomeric material to a porous and friable coke-like material, and, destroy the sealing capability of the seal in its entirety.

It is at this point that the utility of the fire-ring 26 becomes evident, and, its ability to prevent or limit the fluid contents of the pipeline, which usually are under pressure, from escaping between the juxtaposed ends of the pipes and into the cavity in the coupling segments provided for reception of the elastomeric seal 18. In the absence of the fire-ring, the fluid contents of the pipeline would then have directed access to the exterior of the coupling, primarily through the spaces which exist between the bolting pads of the coupling segments, and secondarily, by seepage under and around the respective keys 12.

In the event of burn-out of the elastomeric seal, which can progress up to the fire-ring 26, then, by a combination of axial expansion of the pipes due to the increasing ambient temperature, and, the inherent spring force stored in the fire-ring 26 and which acts in a direction to increase the axial length of the fire-ring 26, the fire-ring will come into direct sealing contact with the juxtaposed ends of the pipes, and prevent or very considerably reduce leakage out of the pipes at the juxtaposed ends thereof. Due to the temperature gradient, and softening of the elastomeric material comprising the remaining portion of the radial annular flange 24, the fire-ring 26 will act to retain the remaining portion of the radial annular flange in its position extending into and in mechanical registry with the pipes, in which position the said remaining portion of the radial annular flange is exposed to and cooled by the fluid contents of the pipeline assembly.

Thus, even in the event of a complete burn-out of the elastomeric seal, a residual ring-shaped portion of the elastomeric seal is retained in efficient sealing relationship with the respective pipe ends, this acting against leakage past the fire-ring, and at least temporarily maintaining an efficient seal at the pipe ends. It has been found that even in the event of total burn-out of the main body of the elastomeric seal 18, the residual portion of the annular radial flange will maintain its sealing capabilities for periods well in excess of 20 minutes, during which time it is to be assumed that the external conflagration will have been brought under control.

Figure 2:
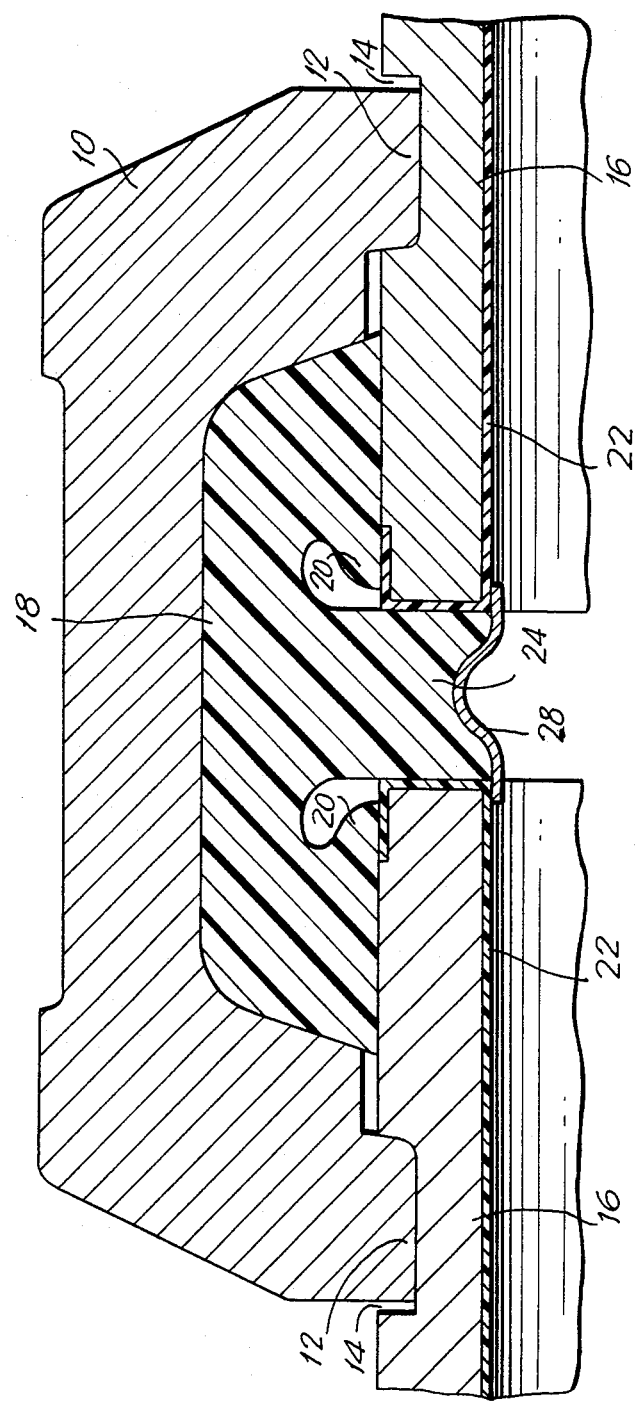
FIG. 2 is a similar cross-section through an alternative form of heat resistant seal according to the present invention; and, FIGS. 3, 4, 5, 6 and 7 are similar cross-sections through other alternative forms of heat resistant seal according to the present invention.

A modification of the gasket and fire-ring assembly of FIG. 1 is shown in FIG. 2. In FIG. 2, instead of being positioned between the pipe ends as in FIG. 1, the fire-ring 28 is positioned within the pipes, and is of greater axial width than the spacing between the pipe ends such that it engages the radially inner corners of the adjacent pipe ends.

Figure 3:
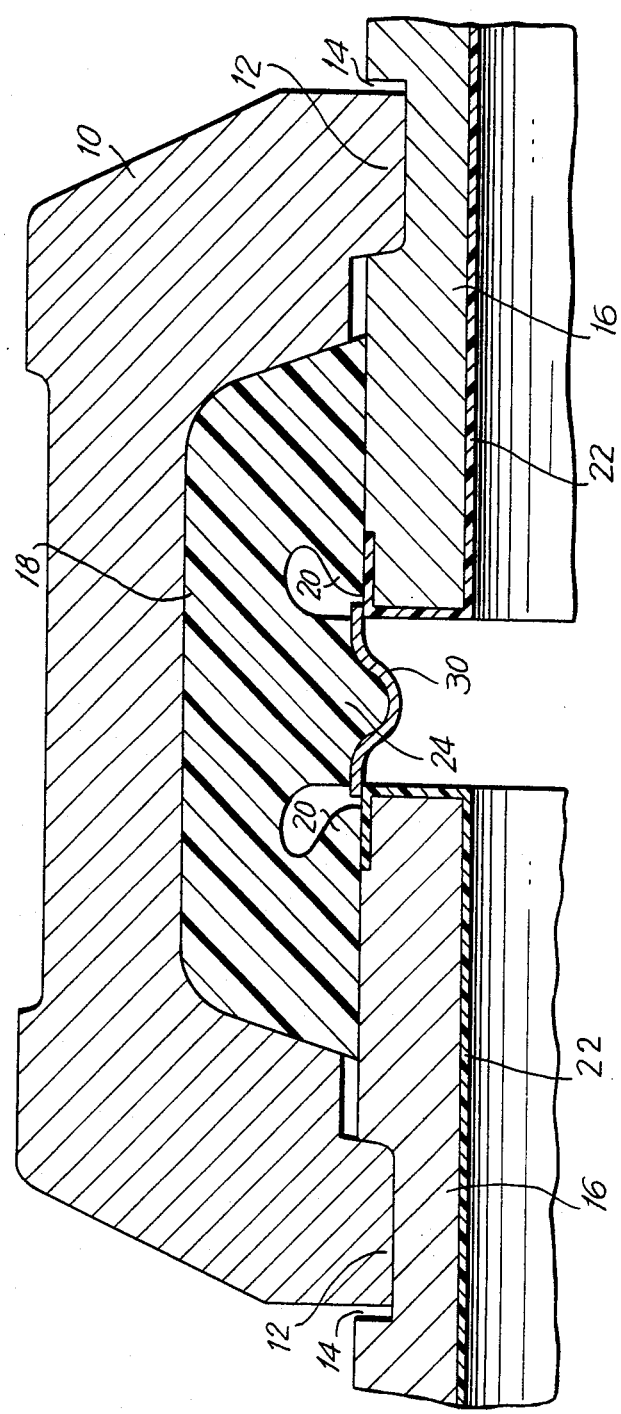

In FIG. 3, the fire-ring 30 is inverted in configuration as compared with FIGS. 1 and 2 for it to be radially inwardly convex between its axial ends, and, the fire-ring is made of greater axial width than the expected spacing between the juxtaposed ends of the pipes, and of greater diameter at its axial ends than the external diameter of the pipes. For convenience in handling, the fire-ring 30 is positionally secured with respect to the gasket 18 by means of a short radially inwardly extending annular flange, which either is a press-fit within the fire-ring 30, or, is molded with the fire-ring 30 in situ such that the fire-ring 30 is directly secured to the elastomeric seal 18.

Provided that the coupling segments provide for a reduction in the gap between the juxtaposed ends of the pipes as the coupling segments are tightened down, then, as illustrated in FIG. 3, the juxtaposed ends of the pipes will move into metal-to-metal sealing engagement with the fire-ring 30 at their radially outer corners. Thus, if the elastomeric seal should become thermally destroyed, again, the fire-ring will provide an effective seal between the juxtaposed pipe ends.

Figure 4:
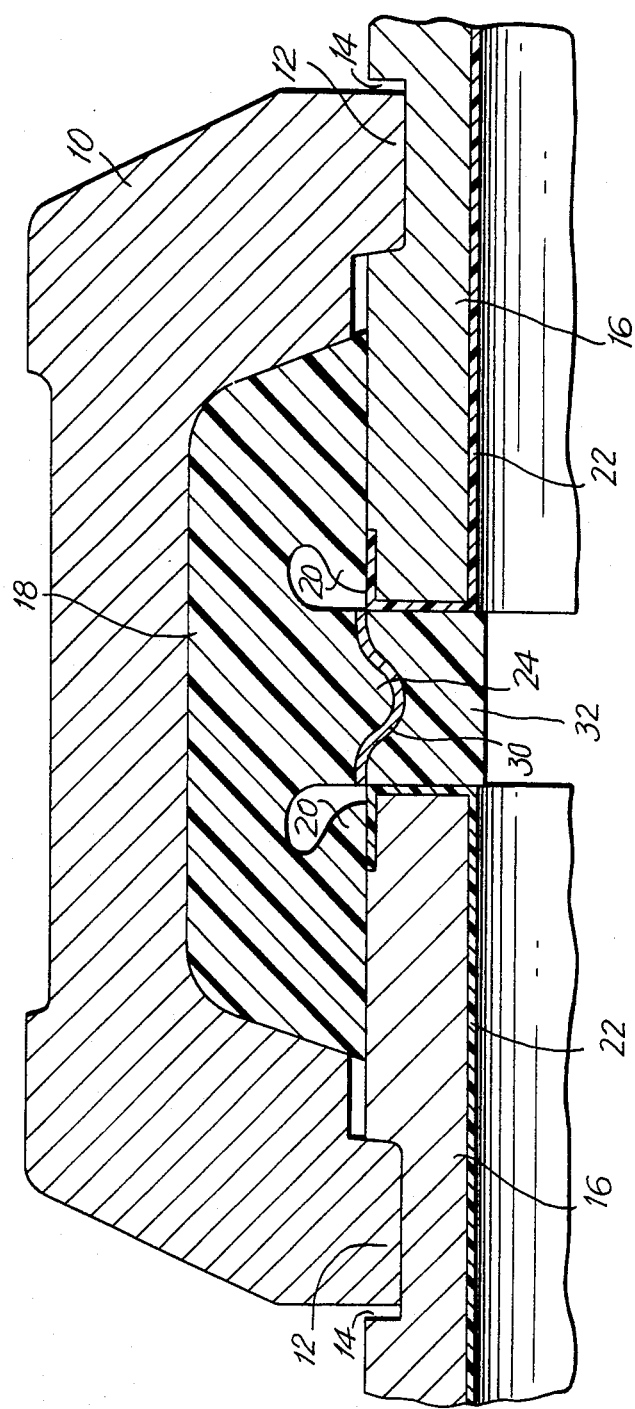

Alternative configurations of the seal of FIG. 3 are shown in FIGS. 4 and 5, in which corresponding members are identified by the same reference numerals as those used in FIG. 3.

In FIG. 4, the inwardly concave fire-ring supports a radially inward extension 30 of the annular flange 24, for engagement by the juxtaposed ends of the pipes, in a similar manner to the embodiment of FIG. 1. The extension 30 can either be molded insitu, or, it can be molded separately and snapped into the fire-ring 30.

A similar configuration is provided in FIG. 5 to the one of FIG. 4, the major difference being that the fire-ring 30 has portions 34, 36 of the radial flange molded directly thereon as a sub-assembly that is insertable into a separately molded seal 18 as a pre-assembled unit.

In FIG. 6, the fire-ring 30 is free-floating within the elastomeric seal 18, and is not directly attached thereto. The fire-ring 30, prior to assembly of the joint between the pipe ends is maintained captive within the elastomeric seal, by virtue of its external diameter at its side edges being greater than the internal diameter of the sealing lips 20 when in their un-stressed condition. In that condition, the sealing lips 20 extend radially inwardly at a small angle of 5 to 10 degrees, such that they are stretched over the pipe ends as the pipe ends are inserted into the elastomeric seal. As the fire-ring is freely radially displacable, but trapped within the elastomeric gasket, the fire-ring will automatically center itself and seat on the outer corners of the adjacent juxtaposed pipe ends as the assembly proceeds, and eventually reach exactly the same orientation as that arising in the embodiments of FIGS. 3 to 5.

FIG. 7 proceeds from the embodiment of FIG. 6, and further includes a radially inwardly extending flange portion 36 either molded insitu within the fire-ring, or, separately molded and snapped into the fire-ring.

While preferred embodiments of the invention have been described above, it wil be appreciated that various modifications may be made within the sccope of the appended claims. For example, rather than to be circumferentially continuous, the fire-ring of FIG. 1 can be circumferentially perforated or slotted in order to increase the anchoring of the fire-ring within the elastomeric gasket. Various other modifications will suggest themselves within the scope of the invention as defined in the appended claims.

We claim:

1. A fail-safe fire retardant seal assembly for use in a segmented pipe-coupling of the type including plural coupling segments adapted to be secured in encircling relationship about the juxtaposed ends of pipes, and which provide an internal annular channel for the reception of said seal assembly, said seal assembly including:

an annular seal member formed from a thermally destructible elastomeric material, said seal member comprising an annular body having mutually presented sealing lips on an inner periphery thereof, said sealing lips extending towards each other and terminating in free edges which seal against the ends of the pipes, said free edges being mutually presented and spaced from each other to define a circumferentially extending slot in the inner periphery of said annular body; and, an annular ring of a fire resistant material positioned substantially in co-axial alignment with the longitudinal axis of said annular seal member and supported by said seal member, said fire ring extending to opposite sides of a plane radial to the longitudinal axis of said annular body and which lies intermediate the free ends of said mutually presented sealing lips, said fire ring extending axially of said seal member and including at least a portion of said fire ring positioned radially inwardly of said sealing lips and which provides for direct, bridging, sealing engagement with said pipe ends, whereby said fire ring provides a direct seal with said pipe ends in the event of thermal destruction of said seal member.

2. The seal assembly of claim 1, in which said metal fire-ring is encapsulated within a radially inwardly extending annular flange integral with said seal member, and which extends radially inwardly through said slot between said terminal edges of said sealing lips.

3. The seal assembly of claim 2, in which said fire-ring has an axial width closely approximating the axial thickness of said radially inwardly extending flange, and which is positioned intermediate the radially innermost diameter of said annular flange and the radially outermost connection of said flange to said seal member.

4. The seal assembly of claim 3, in which said fire-ring is radially outwardly convex between its axial ends.

5. The seal assembly of claim 21, in which said fire ring is supported by a radially inwardly extending annular flange integral with said seal member, and which extends into engagement with an outer periphery of said fire-ring 6. The seal assembly of claim 5, in which said radially inwardly extending annular flange extends radially inwardly beyond said sealing lips to position said fire-ring for engagement with the internal peripheries of juxtaposed pipe ends.

7. The seal assembly of claim 5, in which said annular flange is molded insitu about said fire-ring.

8. The seal assembly of claim 5, in which said fire-ring is a press fit within said annular flange.

9. The seal assembly of claim 1, in which said fire-ring is positioned radially within said sealing lips, and is supported by a radially inwardly extending annular flange integral with said seal member, and which extends into engagement with an outer periphery of said fire-ring for said fire-ring to be engageable with the outer peripheries of juxtaposed pipe ends.

10. The seal assembly of claim 9, in which said annular flange is molded insitu about said fire-ring.

11. The seal assembly of claim 9, in which said fire-ring is a press fit within said annular flange.

12. The seal assembly of claim 9, further including an extension of said radially inwardly extending annular flange extending radially inwardly of said fire-ring and for engagement by juxtaposed ends of said pipes.

13. The seal assembly of claim 12, in which said extension is molded insitu about said fire-ring.

14. The seal assembly of claim 12, in which said fire-ring is a press fit within said extension.

15. The sealing assembly of claim 12, in which said firering is a press fit within said radially outer extension of said radially inwardly extending annular flange.

16. The seal assembly of claim 9, further including a radially outwardly extending annular flange on the outer periphery of said fire-ring, and which is a pres fit within said radially inwardly extending annular flange of said seal member, said fire-ring and its associated radially outwardly extending annular flange, in combination, comprising a subassembly insertable into said seal member.

17. The seal assembly of claim 16, in which said radially outwardly extending annular flange of said fire ring is molded insitu about said fire-ring.

18. The seal assembly of claim 17, further including a radially inwardly extending flange portion of elastomer material positioned within said fire-ring and engageable by the juxtoposed ends of pipe.

19. The seal assembly of claim 1, in which said fire-ring is radially inwardly concave between its axial ends, and is of an axial width greater than the axial spacing between said terminal edges of said sealing lips, for said fire-ring to be movable within and trapped within the said terminal edges of said sealing lips.

20. The sealing assembly of claim 1, in which said seal member is formed from a tumescent elastomer material.

* * * * *